Dec. 22, 1964   E. ZILLMER   3,162,378
SLIDE PROJECTOR WITH ADJUSTABLE LAMP SUPPORT
Filed Jan. 3, 1961   3 Sheets-Sheet 1

INVENTOR
Erich ZILLMER
BY Blum, Moscovitz,
Friedman & Blum
ATTORNEYS

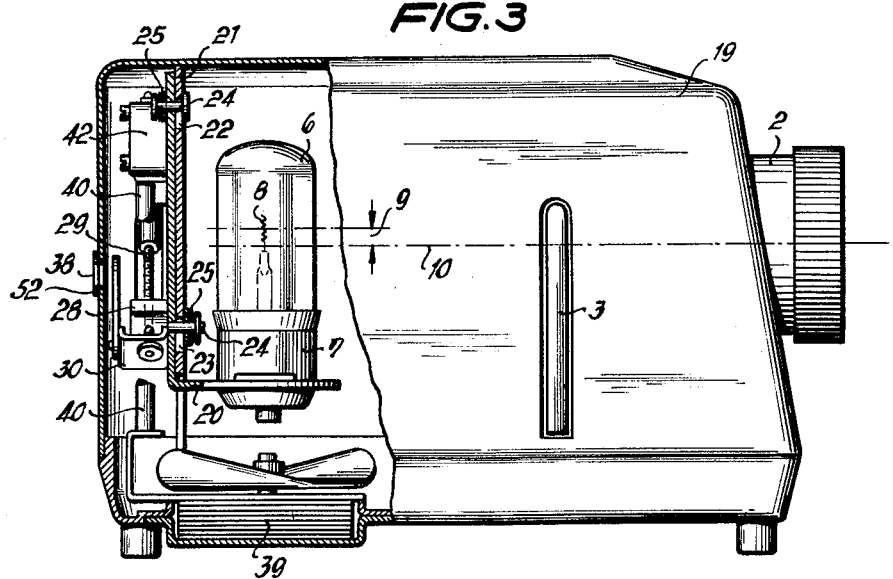
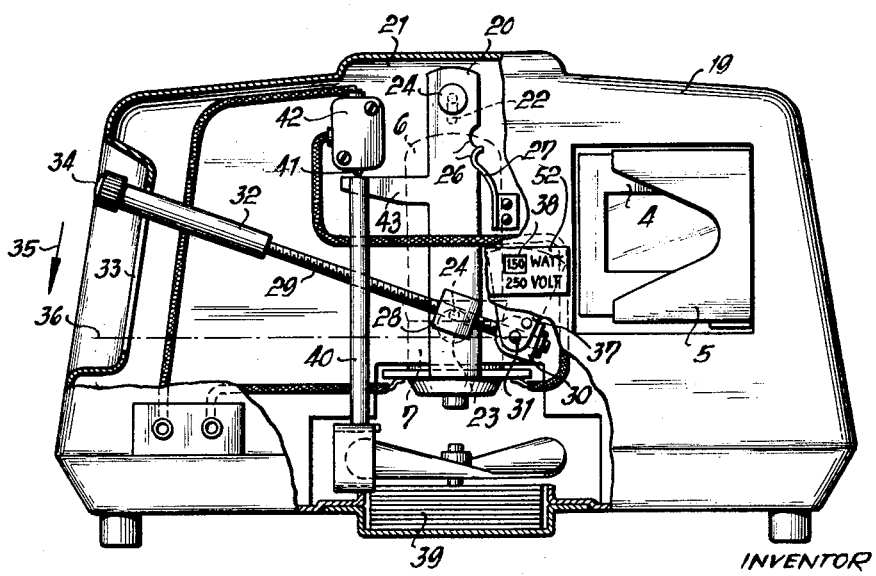

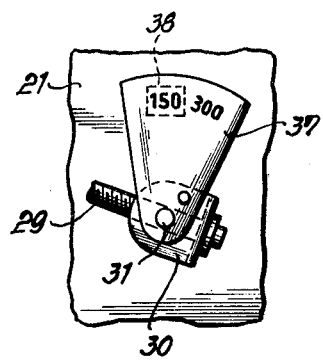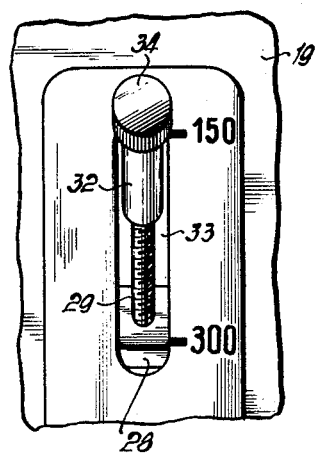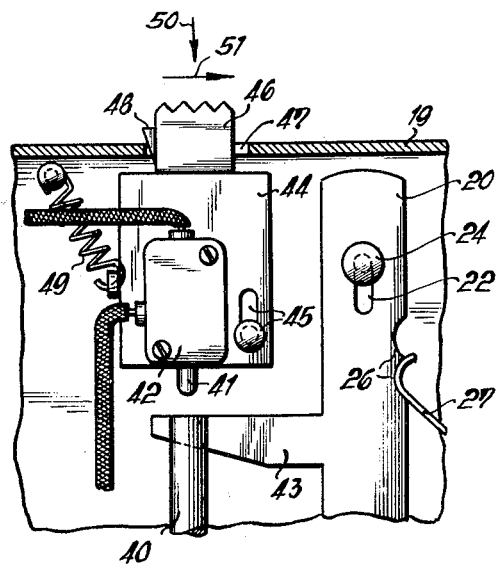

United States Patent Office 3,162,378
Patented Dec. 22, 1964

3,162,378
SLIDE PROJECTOR WITH ADJUSTABLE
LAMP SUPPORT
Erich Zillmer, Braunschweig, Germany, assignor to Voigtlander A.G., Braunschweig, Germany, a corporation of Germany
Filed Jan. 3, 1961, Ser. No. 80,200
11 Claims. (Cl. 240—44.2)

This invention relates to slide projectors and, more particularly, to novel slide projectors provided with lamp supports which are adjustable relative to the projector optical axis to position projector lamps of different ratings correctly with respect to the optical axis of the projector.

The lamp rating or light output required for different projectors varies in accordance with the purpose for which the projectors are to be used. It is therefore desirable to provide projectors with means whereby lamps of different ratings or light output can be employed interchangeably in the same projector. However, accomplishment of this objective is hindered by the fact that lamps of different ratings differ not only in size, but also in the distance between the base of the lamp and the light element or luminous center or spot thereof, such as the filament of an incandescent lamp.

This latter difference is particularly true when comparing a projector lamp having a rating of 150 watts with a projector lamp having a rating of 300 watts, although the position of the filament or light element is essentially the same in both a 300 watt lamp and a 500 watt lamp. Unless the light element or filament is properly positioned with respect to the optical axis of the projector, and with respect to the light projecting system and the slide support thereof, the image field is insufficiently illuminated.

In accordance with the present invention, these difficulties are overcome by providing, in a slide projector, a lamp support which is so mounted that it may be shifted in a plane perpendicular to the projector optical axis to properly align the light element or luminous spot of lamps of different ratings with the optical axis of the projector. Thereby, the lighting element or filament of the lamp can be readily positioned so that it will provide proper illumination of the image field.

In accordance with the invention, the lamp support is mounted for vertical adjustment between vertically spaced and stationary limiting stops, and preferably is further mounted so that it may be adjusted laterally of the optical axis. This latter arrangement provides for effective lateral alignment of the filament or light element of the lamp with the optical axis of the projector.

In further accordance with the invention, means are provided whereby, when a lamp of a higher rating than normal and requiring forced draft cooling, is mounted in the projector, the lamp energizing circuit cannot be closed unless a mechanical cooling means is also positioned in the projector.

For an understanding of the principles of the invention, reference is made to the following description of typical embodiments thereof as illustrated in the accompanying drawings. In the drawings:

FIG. 3 is a view, similar to FIG. 1, of another form of slide projector embodying the invention;

FIG. 4 is a view, similar to FIG. 2, of the slide projector shown in FIG. 3;

FIGS. 5 and 6 are partial elevational views of the projector shown in FIGS. 3 and 4, and illustrating details thereof; and FIG. 7 is a partial elevational and partial sectional view of a modified form of the lamp switch control arrangement used in the embodiments of FIGS. 3 and 4.

Figure 1:
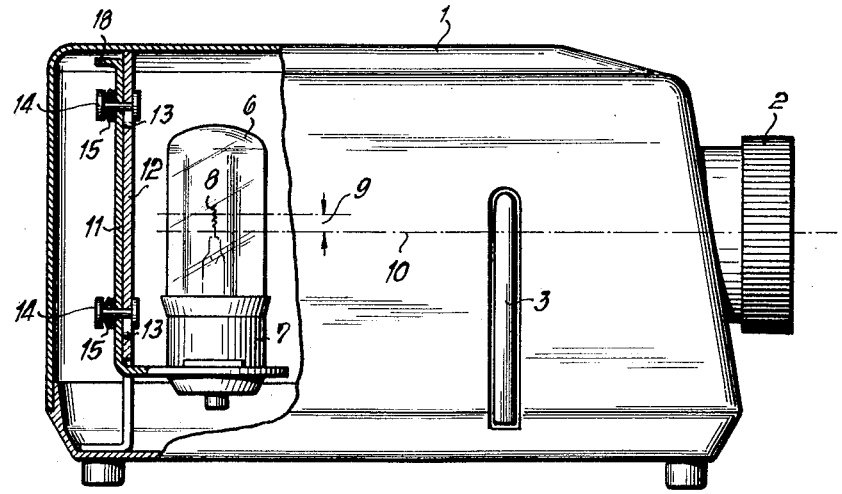
FIG. 1 is a side elevational view, partly broken away and partly in section, of one form of slide projector embodying the invention.
Figure 2:
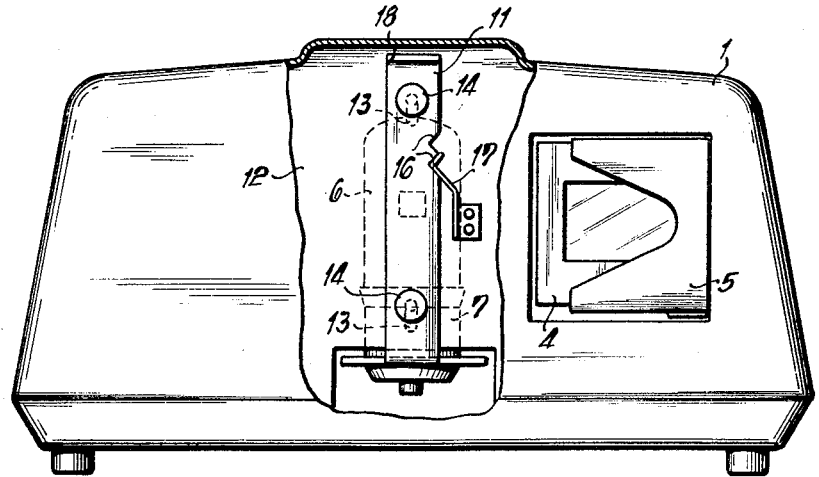
FIG. 2 is an end elevational view, partly broken away, of the slide projector shown in FIG. 1.

Referring to FIGS. 1 and 2, a slide projector 1 illustrated therein is provided with an objective lens 2 and a slide shifter 3. By means of slide shifter 3, slides 4 can be displaced laterally, either automatically or manually and in a known manner, from a magazine 5 into the projection position, and can be returned again to the magazine 5. The projector lamp bulb 6 is seated in a holder or socket 7.

As previously stated, projector lamp bulbs of different ratings differ with respect to their overall size and also with respect to the positions of their luminous spots or light elements relative to the lamp base. If, for example, a projector lamp bulb having a rating of 150 watts is replaced by a projector lamp bulb having a rating of 300 watts, the luminous spot or filament of the latter will occupy, when the 300 watt lamp bulb is mounted in the projector, a position different from that of the luminous spot of the 150 watt lamp bulb when the latter is mounted in the projector. This difference is shown in FIG. 1. The projector lamp bulb 6 seated in socket 7 is, in the case of FIG. 1, a 300 watt lamp bulb. The luminous spot, which is governed by the position of the light element or filament 8, is positioned at a distance 9 from the optical axis 10 of the projector objective 2, when the socket 7 is in a position designed for properly positioning a 150 watt lamp bulb.

A projector lamp bulb, such as lamp 6 shown in FIG. 1, will not, in the illustrated position, illuminate the image field at all or, in any event, only to a limited extent. For proper illumination of the image field, the light element 8 must have its luminous spot brought into alignment with the axis 10.

In the arrangement shown in FIG. 1, this is readily effected by mounting socket 7 on a bracket 11 which is vertically adjustable along an upright or narrow partition 12 within the slide projector 1. Vertically extending and elongated space holes 13 in the upright 12 serve as guides for bolts 14 secured in bracket 11, coil spring 15 being disposed around the bolts 14 between the bolt heads and the bracket 11, to assure frictional contact between bracket 11 and upright 12. For the purpose of releasably retaining bracket 11 in either one of two vertically spaced positions, bracket 11 is formed with vertically spaced notches 13 engaged by a retainer spring 17 which may be secured to the upright 12 and has an end frictionally engageable in the notches 16. Bracket 11 has an angular extension 18 at its upper end which serves as a grip for shifting the bracket vertically.

When a projector lamp bulb having a relatively low rating is mounted in the projector, the natural circulation of air provided by heat dissipated from the lamp bulb provides sufficient cooling for the bulb. However, where lamp bulbs of higher ratings are used, it is usually necessary to provide forced draft cooling for the lamps. FIGS. 3 through 7 illustrate a projector which is intended for use with a projector lamp bulb of relatively low output or rating, but which can also be used with projector lamp bulbs having relatively high ratings, provided a cooling unit is connected into the projector. In the same manner as in the case of the projector 1 of FIGS. 1 and 2, the projector 19 of FIGS. 3 through 6 is provided with an objective lens 2 and a slide shifter 3 for slides 4 mounted in a magazine 5. Also, the projector lamp is mounted in a socket 7 which is secured to a bracket 20.

Bracket 20 is vertically displaceable along an upright or intermediate wall 21 formed with an upper vertically extending and elongated hole or opening 22 and a lower opening 23. Openings 22 and 23 receive pins or bolts 24 secured in bracket 20 and embraced by coil springs 25 which assure a frictional contact between bracket 20 and wall 21. Bracket 20 is further formed with notches 26 cooperable with a retaining spring 27 mounted on wall 21 and effective to retain the bracket 20 in either of two vertically spaced limiting positions.

A block 28 is oscillatably secured to the pin 24 extending through the opening 23, and is formed with a threaded opening therethrough receiving a threaded portion of a spindle 29. The inner end of spindle 29 is rotatably secured to a channel section element 30 which is oscillatably mounted on the wall 21 by means of a bolt 31. An extension 32 is secured non-rotatably to the outer end of spindle 29 and extends through a slot 33 in the projector housing. The outer end of extension 32 is provided with a knurled operating knob 34.

When extension 32 is moved downwardly in a slot 33 in the direction indicated by the arrow 35, the spindle 29 is swung about the axis of the bolt 31 and thereby displaces the block 28. Block 28, in turn, displaces bracket 20 downwardly until it assumes a position in which spring 27 is engaged in the upper notch 26. This position is attained when extension 32 has traversed the entire length of slot 33, the broken line 36 indicating the position of spindle 29 and extension 32 in this latter position.

As best seen in FIG. 3, such movement of the bracket 20 will cause the lamp bulb 6 to shift by the distance 9, so that the light element or luminous spot 8 of the lamp bulb has been moved into a position horizontally aligned with the optical axis 10 of the objective lens 2.

As best seen in FIGS 4 and 5, the projector 19 includes cooperating indicia means, respectively fixed relative to lever 29 and the projector, for indicating the respective positions of bracket 20. A sector shaped plate 37 is fixedly secured to the channel shaped element 30, so that it moved with the latter. This scale plate 30 has marked thereon the indicia "150" and "300," either one of which is exposed through an opening or window 38 in the projector housing, depending upon the position of bracket 20. In the position illustrated in the drawing, the indicia "150" is visible through the window 38. This indicates that bracket 20 is in a position wherein 150 watt lamp bulbs mounted in the sockets 7 will have their light elements or luminous spots 8 at the level of the axis 10 of the objective lens 2. When the spindle 29, with its extension 32, is moved to the position indicated by the broken line 36, the indicia "300" will appear in the window 38. The bracket 20 will then be in the proper position for horizontally aligning the luminous spot or light element of a 300 watt lamp with the optical axis. A name plate 52 surrounds the opening 38 and has provided thereon the other electrical data of the projector. The indicia "150" and "300" can also be provided alongside the slot 33, as shown in FIG. 6, so that they can cooperate with knurled knob or head 34 to indicate the particular setting of the bracket 20. In the arrangement of FIG. 6, knob 34 and the indicia "150" and "300" constitute the cooperating indicia means respectively fixed relative to the projector and to the lever 29.

The adjusting means for the bracket 20, shown in FIGS. 3 through 6, is not only capable of vertical adjustment of the lamp but is further capable of lateral shifting of the lamp. When knurled head 34 is turned, block 28 is moved along the thread of spindle 29 so that bracket 20 will swing about the upper pin 24, extending through the hole or slot 22, the amount of such swinging being limited by the lateral dimensions of the opening 23. Hence, by turning knob 34, a lamp bulb seated in socket 7 can be displaced laterally with respect to the optical axis of the objective.

Where projector lamps having output ratings of 300 watts or more are used, special forced draft cooling means must be provided. FIGS. 3 and 4 illustrate a forced draft means, or cooling unit, 39 which is mounted in the projector 19, the forced draft means being represented as a fan driven by an electric motor. In order to prevent operation of the projector with a 300 watt lamp bulb therein but without cooling unit 39 therein, a limit stop 40 is secured to the housing of the cooling unit 39 and engages a spring loaded operating pin 41 of a normally open switch 42 connected in the lamp energizing circuit. Thereby, when cooling unit 39 is mounted in the projector, its stop 40 will engage pin 41 and hold the switch 42 closed.

As can be best seen in FIG. 4, there is a laterally extending arm 43 on the bracket 20 which also engages the operating pin 41 of switch 42, conjointly with the limit stop 40. When bracket 20 is adjusted to the proper height for a 150 watt lamp bulb, arm 43 engages pin 41 and holds switch 42 closed. However, if the cooling means 39 is not mounted in the projector 19, and if bracket 20 is shifted to the position required for a 300 watt lamp, for example, arm 43 will disengage the pin 41 to open switch 42 and thus break the lamp energizing circuit. When the cooling means 39 is not mounted in the projector 19, the lamp support adjusting device (29, 32, 34) can also serve as a switch opening and switch closing means for the lamp energizing circuit. In such case, there can be provided, in addition to the indicia indicating the lamp ratings, the words "on" and "off" alongside the slot 33, for cooperation with knob 34 to indicate whether the lamp circuit is opened or closed.

In the arrangement illustrated in FIGS. 3 and 4, the lamp circuit is therefore closed whenever the bracket 20 is in the proper position for a 150 watt lamp bulb, and also whenever the cooling means 39 is mounted within the projector 19. To break the light circuit, therefore, a second switch 42 would have to be provided. FIG. 7 illustrates a switch arrangement by means of which it is possible to make or break the lamp circuit in the case when bracket 20 is in a position corresponding to a lamp bulb having a 150 watt rating and while the cooling means 39 is mounted within the projector.

Referring to FIG. 7, it will be noted that the bracket 20, which is shown only in part, and the limiting stop 40, are illustrated in the same position as in FIG. 4. However, while the arrangement shown in FIGS. 3 and 4 illustrates the switch 42 as fixedly mounted in the projector 19, in the arrangement of FIG. 7, this switch is mounted on a plate 44 which is displaceable by means of movement along a pin and slot guide illustrated at 45. A selector operator 46 projects through an elongated opening 47 of the wall of projector 19, and is secured to the plate 44. This selector operator 46 has extending laterally therefrom a stop cam 48, and a spring 49 is connected between a fixed part of the projector 19 and the plate 44 to bias the plate 44 to the left as viewed in FIG. 7.

In the position shown in FIG. 7, pin 41 is out of contact with both stop 40 and arm 43. The open switch 42 thus breaks the lamp energizing circuit. When selector operator 46 is pressed inwardly in a direction indicated by the arrow 50, the switch plate 44, guided by the elements 45, moves downwardly against the tension of the spring 49. Thereby, pin 41 engages stop 40 or arm 43, or both, and the switch 42 is closed as selector operator 46 is thus pressed downwardly. After a certain downward movement of the selector operator 46, stop cam 48 will have passed entirely through the opening 47 and the spring 49 will then bias the plate 44 to the left to such an extent that cam 48 will engage the inner surface of the housing wall formed with the slot 47. Thereby, plate 44 is locked in its downward position. When the selector operator 46 is shifted laterally in the direction of the arrow 51, the stop cam 48 is brought into alignment with the opening 47 so that spring 49 can bias plate 44 upwardly into the position illustrated in FIG. 7 in which the lamp energizing circuit is broken.

In the arrangement shown in FIG. 7, when the bracket 20 is in the position proper for a 300 watt projector lamp bulb, and when no cooling unit is mounted inside the projector, it is impossible to close the lamp circuit since, in this case, the arm 43 is outside the range of travel of pin 41, and limiting stop 40 is completely absent.

While specific embodiments of the invention have been shown and described in detail in order to illustrate the application of the principles of the invention, it will be understood that the invention may be embodied otherwise without departing from such principles.

What is claimed is:

1. A slide projector comprising, in combination, a housing; means providing a fixed optical axis for said projector; an upwardly extending element fixed within said housing; a socket support slidably mounted upon said element; and a lamp socket fixedly mounted on said support and arranged to interchangeably receive projector lamp bulbs of different ratings and having respectively significantly different spacings of their respective luminous spots from their respective socket-engaging bases; said socket support and said element being provided with cooperating and vertically spaced pin and aperture means for guiding said socket support for movement, relative to said element and in a plane perpendicular to said optical axis, between selected fixed positions in each of which the base of a respective lamp engaged in said socket is positioned at a distance from said optical axis corresponding to the spacing between the luminous spot of the lamp and the base of the lamp; the pin and aperture of each pin and aperture means having sufficient clearance to provide for such adjustment of said socket support relative to said element and to provide for swinging of said support laterally of the optical axis and in said plane about one of said pin and aperture means; whereby said support may be adjusted both vertically and laterally relative to said optical axis to properly align the luminous spots of lamp bulbs of different ratings with such optical axis.

2. In a slide projector as claimed in claim 1, an elongated operating member pivotally connected at its inner end within the projector for swinging movement in a substantially vertical plane; means connecting an intermediate portion of said member to said support; the outer end of said member projecting through a substantially vertical slot in a wall of the projector; whereby upward and downward movement of the outer end of said member will affect corresponding vertical adjustment of said support relative to the optical axis of the projector; and cooperating indicia means respectively fixed relative to said operating member and fixed relative to the projector, for indicating the adjusted position of said support.

3. In a slide projector as claimed in claim 1, a block oscillatably secured to said support; and an elongated operating member extending through said block and having its inner end pivotally mounted within said projector and its outer end extending through a substantially vertically extending slot in a wall of the projector; whereby vertical movement of the outer end of said elongated member will adjust said support vertically relative to the optical axis of the projector.

4. In a slide projector as claimed in claim 2, the indicia means fixed relative to the operating member being marked on a plate secured to the operating member and said last-named indicia means being selectively exposed through a window in a wall of the projector constituting the other indicia means fixed relative to the projector.

5. In a slide projector as claimed in claim 2, the indicia means fixed relative to the operating member comprising a knob on the outer end thereof, and the indicia means fixed relative to the projector being marked along an edge of said slot.

6. In a slide projector as claimed in claim 4, said window being formed through a data plate on the outer surface of the projector.

7. In a slide projector as claimed in claim 3, said operating member including a spindle threaded through said block, whereby rotation of said spindle will move said support to swing about the upper of a pair of vertically spaced pin and aperture means guiding said support; for lateral adjustment of said support relative to the optical axis of the projector.

8. A slide projector comprising, in combination, a housing; means providing a fixed optical axis for said projector; a socket support: a projector lamp bulb socket fixedly mounted on said support and arranged to have interchangeably mounted therein projector lamp bulbs, of different ratings and having respectively significantly different spacings of their respective luminous spots from their respective socket-engaging bases; means mounting said support within said projector for adjustment both horizontally and vertically of said projector in a plane perpendicular to said optical axis and between selected fixed positions in its plane of adjustment; each fixed position of said socket support being at a distance from said optical axis corresponding to the spacing of the luminous spot from the socket-engaging base of a respective one of said different rating lamp bulbs; whereby said mounting, in each of said fixed positions, positions the base of a respective lamp engaged in said socket at a distance from the optical axis of the projector corresponding to the spacing between the luminous spot and the base of the respective lamp then mounted in said socket; a normally open switch mounted adjacent the path of movement of said support and controlling an energizing circuit for the projector lamp; an operator for said switch; operating means included with said support engaging said operator in only one selected fixed position of said support to close said switch and disengaging said operator in any other selected fixed position of said support to open said switch; whereby said energizing circuit is closed by engagement of said operating means with said operator only when said support is in a position corresponding to optical alignment of a lamp of a respective rating with the optical axis of the projector; a mechanical cooling unit, for the projector lamp, removably mounted in the projector housing; and a limit stop on said unit engageable with said switch operator to close said switch when said unit is positioned in the projector housing.

9. In a slide projector as claimed in claim 8, means mounting said switch in said projector for movement to a position out of the path of the operating means of said support.

10. In a slide projector as claimed in claim 8, means mounting said switch for movement in said projector to a position wherein said switch operator is out of the range of movement of the operating means of said support and out of operative relation with said limit stop.

11. In a slide projector as claimed in claim 9, switch selector means secured to said switch mounting means for moving the latter to a first position wherein said switch operator is in the path of movement of the operating means of said support and for operative engagement by said limit stop; means biasing the switch mounting means to a second position in which the switch operator is out of the range of movement of the operating means of the support and of said limit stop; and means automatically operable to releasably retain said selector and the switch mounting means in said first position.

(References on following page)

References Cited by the Examiner

UNITED STATES PATENTS

| | | | |
|---|---|---|---|
| 1,496,427 | 6/24 | Nelson | 88—24 |
| 1,654,391 | 12/27 | Thornton | 240—44 X |
| 1,699,710 | 1/29 | Pearlman | 240—2 |
| 1,792,292 | 2/31 | Flaherty | 240—78 |
| 2,596,376 | 5/52 | De Gobij | 88—24 |
| 2,977,461 | 3/61 | Jones | 240—78 |

FOREIGN PATENTS

| | | |
|---|---|---|
| 902,177 | 11/44 | France. |
| 205,792 | 5/24 | Great Britain. |
| 203,540 | 6/39 | Switzerland. |

NORTON ANSHER, *Primary Examiner.*

EMIL G. ANDERSON, JEROME SCHNALL,
*Examiners.*